Nov. 14, 1967  S. E. NELSEN  3,352,226
INFUSION PACKAGE
Filed March 15, 1965  2 Sheets-Sheet 1
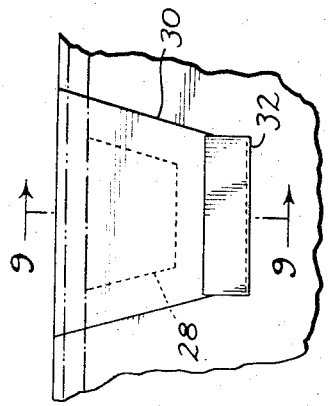
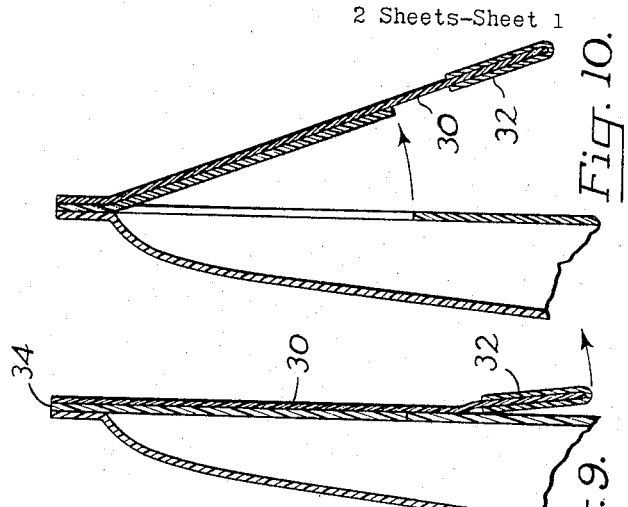
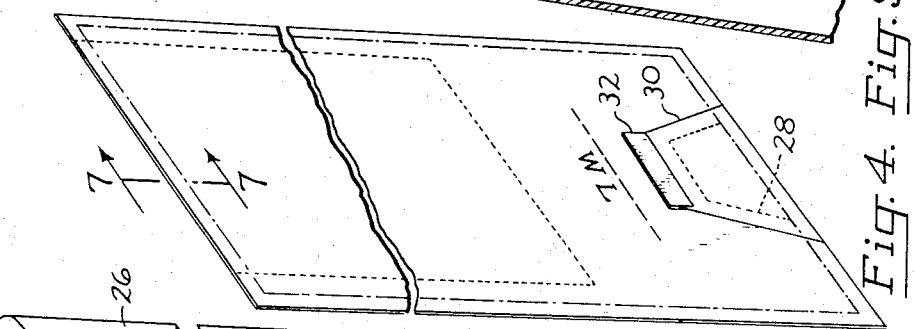
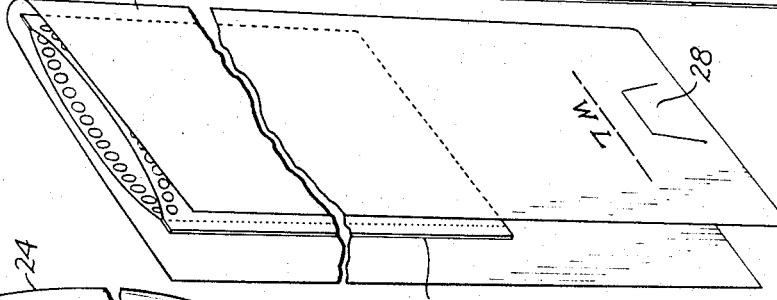
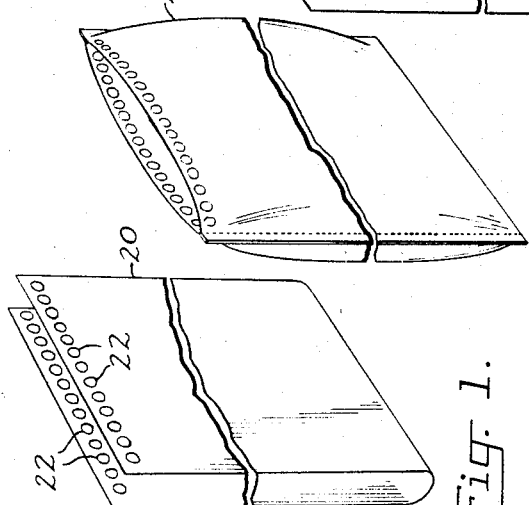
Silas E. Nelsen
INVENTOR Nov. 14, 1967 S. E. NELSEN 3,352,226
INFUSION PACKAGE
Filed March 15, 1965 2 Sheets-Sheet 2
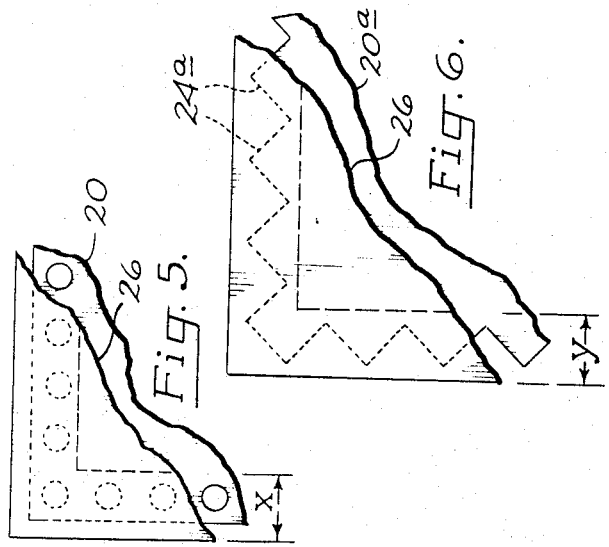
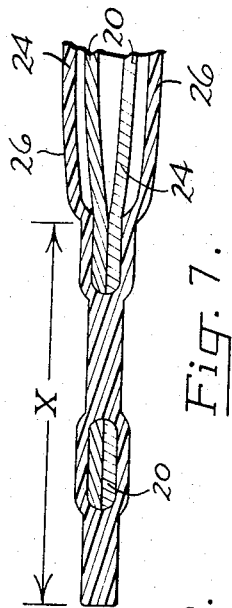
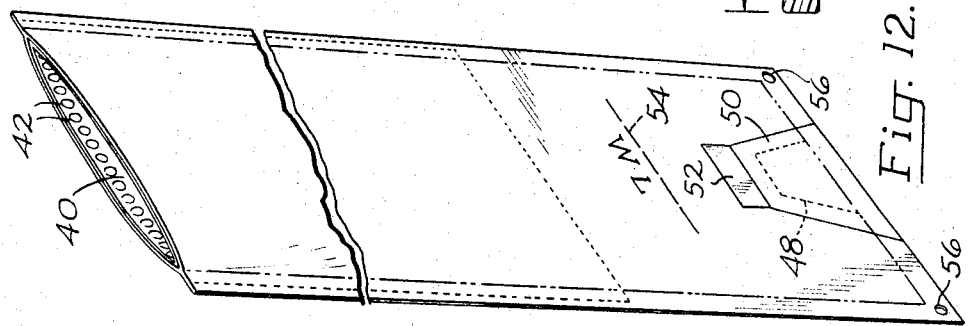
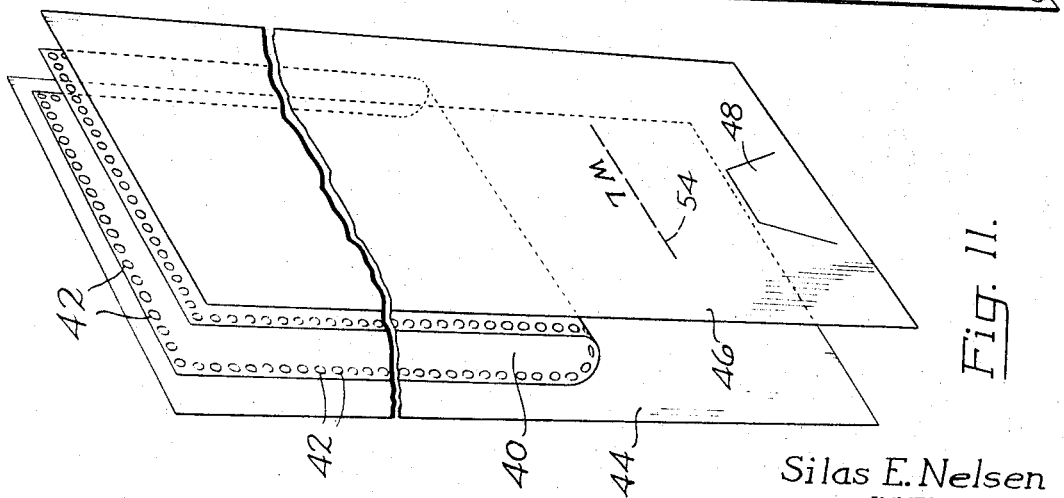
Silas E. Nelsen
INVENTOR
BY Eugene D. Farley
Atty.

United States Patent Office 3,352,226
Patented Nov. 14, 1967

3,352,226
INFUSION PACKAGE
Silas E. Nelsen, 2715 Center St., Tacoma, Wash. 98409
Filed Mar. 15, 1965, Ser. No. 439,701
8 Claims. (Cl. 99—295)

ABSTRACT OF THE DISCLOSURE

A flexible, liquid-pervious inner container of material to be infused is supported at its bottom margin by the bottom margin of a flexible, liquid-impervious outer container of larger area having a closeable opening at its top for filling to a predetermined level with a solvent and for removing the resulting infusion.

---

This invention relates to a package for making infusions. It pertains particularly to an infusion package useful in the preparation of beverage coffee of superior flavor and quality and is described herein with particular reference to this application, although no limitation thereby is intended.

When a measured amount of ground coffee is soaked in a predetermined quantity of cold water, an infusion is formed which may be refrigerated and stored. The infusion then may be used in the preparation of a superior coffee brew merely by measuring out the desired amount of the infusion and adding it to hot water.

The foregoing procedure has several significant advantages.

First, since the ground coffee comes in contact with cold water only, the flavorful, stimulating principles selectively are extracted to the exclusion of the unpleasant, oil components. Hence the coffee prepared from the extract is of demonstrably better flavor, being free from bitter and rancid tasting materials.

Second, the coffee may be made of any desired strength simply by adding more or less of the infused extract to the cup.

Third, the infusion process is carried out easily with a minimum effort and without the necessity of using elaborate extraction apparatus.

Fourth, there is no waste, since only as much of the infusion extract is employed as is required, the remainder being refrigerated and stored.

Accordingly it is the general object of the present invention to provide a package which may be used in making coffee and other solvent infusions in the manner described above.

Another object of the invention is the provision of a package which may be employed first, in the merchandising of ground coffee and then, without removal of the coffee from the package, in the preparation of a cold water coffee infusion.

Another object of the invention is the provision of an infusion package which is self supporting even though made of flexible material, so that it may be stood erect without interfering with the infusion procedure and without requiring special support.

Another object of the invention is the provision of an infusion package which centers the material to be infused and locks it in its centered position so that the extracting solvent will contact it uniformly and efficiently.

Another object of the invention is the provision of an infusion package having a pour opening and novel closure therefor which permits opening and resealing the package as often as necessary.

Still another object of the invention is the provision of a method for making an infusion package which method may be practiced contemporaneously with the filling operation during which the package is charged with coffee or other material to be infused.

In the drawings:

FIGS. 1–4 illustrate the method of making the presently described infusion package in one of its forms, the views being perspective views illustrating the fabricating sequence;

FIGS. 5, 6 and 7 are fragmentary views, FIGS. 5 and 6 being in plan and FIG. 7 in section, taken along line 7—7 of FIG. 4, illustrating a sealing procedure employed in the fabrication of the package;

FIGS. 8, 9 and 10 are fragmentary views, FIG. 8 being in plan and FIGS. 9 and 10 being in section, taken along line 9—9 of FIG. 8, of a pour opening incorporated in the package and a releasable closure therefor, FIG. 9 illustrating the closure in its closed position and FIG. 10 illustrating the closure in its open position; and FIGS. 11 and 12 are perspective views illustrating a method of making the presently described infusion package in another of its embodiments.

The infusion package of my invention broadly comprises a flexible, liquid-impervious outer container adapted to be filled to a predetermined level with water or other selected solvent. Positioned within the outer container is a flexible, liquid-pervious inner container having an area smaller than the area of the outer container and adapted to be filled with the material to be infused.

Selected marginal portions of the two containers, for example the bottom margins, are overlapped. The lapped marginal portions are sealed liquid tight to each other. This anchors the inner container and locates it in spaced relation to the outer container when the package is applied to an infusing operation.

In the area not overlying the inner container, the outer container is provided with a pour opening having releasable sealing means keeping it normally closed. Thus the package may be filled with the infusion material at the time of manufacture, shipped to points of distribution and sold to the user. The user thereupon opens the pour opening, adds the extracting solvent, steeps the material for a predetermined time and pours out the resulting infusion. The package used both for merchandising and infusing then may be discharded with the spent material.

In FIGS. 1–4 form of the invention, the inner container of the package, used to contain the ground coffee or other material to be infused, is formed from a single flexible sheet 20 of a water-pervious material such as unwoven cotton or water pervious plastic. In the alternative, it may be made from a woven cloth or a porous material having mesh openings of substantial size.

The opposite ends of sheet 20 are provided with a plurality of spaced perforations 22. When the sheet is bent reversely, as illustrated in FIG. 1, perforations 22 register with each other.

In the next step of the operation, the longitudinal side edges of the folded sheet are fastened together, as by being sewn together. This forms the inner container 24, which is water-pervious and which may be filled with the ground coffee.

The outer container or envelope 26 is formed by bending reversely a sheet of flexible, water-impervious material such as a clear sheet of thermoplastic material. This sheet is dimensioned relative to sheet 20 in such proportions that when it is folded, as indicated in FIG. 3, its overall area is somewhat greater than the area of the inner container. Where the inner container and the outer container are rectangular, envelope 26 may be substantially longer and somewhat wider than inner container 24.

In the FIGS. 3 and 4 arrangement, the package is illustrated in its upside down position. Inner container 24 is so placed that its perforated margins substantially register with the lower end margin of the outer envelope. The two side margins of the inner container are arranged so that the inner container is centered with respect to the outer envelope. This leaves envelope margins on both sides as well as a top area wherein the envelope does not overlie the inner container.

All four margins of the assembly then are sealed either through the use of a suitable adhesive or, where a thermoplastic outer sheet is used, by heat sealing.

As a result of the sealing operation, the two side margins and the top margin of the outer envelope are sealed liquid-tight without involving the inner container. The lower end margin X of the envelope, however, forms a locking seal with the perforated inner end of the container.

The result is detailed in FIGS. 5 and 7.

From the latter figures, it will be observed that the overlying sections of the bottom end margin of sheet 26 are fused and sealed together wherever they come in contact with each other. This includes the areas of perforations 22. Accordingly, not only is the bottom margin X of the package sealed liquid-tight, but the inner container is locked in position by the individual seals present in each perforation.

It will be apparent that to effectuate the foregoing purpose apertures other than perforations through the sheet material may be employed. For example, the edges of the sheet may be notched rather than perforated. This form of the invention is shown in FIG. 6, where sheet 20a is formed with notch-defining projections 24a. When the marginal area y of the assembly is sealed, the notched edges of the inner container will be involved in the seal so that the inner container is locked in place.

In still another embodiment, the inner container may be provided with integral apertures. This may be accomplished by using a coarse mesh fabric as the material of which the inner container is made. The space between the meshes or pores of the fabric then will provide the apertures through which the thermoplastic outer sheet flows and seals itself.

As has been indicated above the package of the invention is provided with a pour opening and releasable means for sealing it shut. These features of the invention are illustrated in FIGS. 3, 4 and 8–10.

Outer sheet 26 is provided in its top portion with a cut slit which forms a flap 28. This forms the pour opening.

The closure 30 comprises a piece of pressure sensitive tape of sufficient area to overlie not only flap 28, but also the surrounding marginal area of the outer container. A lifting tab 32 is fixed to the lower end of the tape. This insulates the sticky surface 34 thereof from contact with the outer sheet of the package.

The strip of pressure sensitive tape may be used to hold flap 28 closed, as indicated in FIG. 9. However, upon pulling on tab 32, the flap is lifted to the position of FIG. 10 by the adhesion of the pressure sensitive tape. The flap thus may be opened and close as often as desirable or necessary.

In the form of the invention illustrated in the inverted views of FIGS. 11 and 12, the inner container of the package, used to contain the ground coffee or other material to be infused, also is formed from a single flexible sheet 40 of water-pervious material such as unwoven cotton. In the alternative it may be made from woven cloth of a coarse material having mesh openings of substantial size or of a water pervious plastic sheet.

The opposite ends and the sides of sheet 40 are formed with marginal rows of spaced perforations 42. When the sheet is reversely bent, as illustrated in FIG. 11, the perforations register with each other.

The inner container is formed in the same operation by which the outer container is formed. To this end, the reversely bent inner sheet 40 is placed between a pair of sheets 44, 46 made of flexible, water-impervious material such as sheets of clear thermoplastic material.

Sheets 44, 46 preferably are of the same size and are dimensioned relative to reversely folded inner sheet 40 in such proportions that the width of the outer sheets is substantially the same as the width of the inner sheet. However, their length is substantially greater. Thus when the three sheets are assembled in the relationship shown in FIG. 11, the perforated, registering end and side margins of the reversely bent inner sheet 40 are overlapped by the end and side margins of the outer sheets 44, 46.

This makes it possible to form the inner and outer containers in a single operation simply by securing together the margins of the component sheets. In one mode of procedure this may be accomplished by applying a suitable adhesive to the margins, thereby joining them.

In another and preferred mode of operation, applicable where the other sheets are made of thermoplastic material, it may be accomplished by heat sealing the margins of the outer sheets to each other. When this is done, the thermoplastic material will flow through perforations 42 of the inner sheet, locking the marginal areas of the inner sheet to the outer sheet.

Normally the heat sealing procedure would be effectuated in two stages. In the first, the side and bottom end margins only of the outer sheets are heat sealed. This leaves the FIG. 12 structure in which the bottom of the package is left open for the introduction of ground coffee or other infusion material. After such introduction, the bottom margins of the outer sheets may be heat sealed to close the package.

Like the previously described embodiment, the package of FIGS. 11 and 12 is provided with a sealed pour opening. This may be furnished by a flap 48 defined by communicating slits cut through the upper part of sheet 46. A piece 50 of pressure sensitive tape having a lift tab 52 may be placed over the flap and adjoining area to form a releasable seal for the opening. As explained above, the tape not only seals the opening but also lifts flap 48 when the seal is removed.

As an additional feature there may be provided a water line indicator 54 on outside sheet 46, located slightly below the pour opening; and reinforced openings 56 in one or both of the upper corners so that in use the package may be supported by hanging it on a hook, nail, or other projection.

Although the manner of fabrication of the illustrated packages of the invention is somewhat different, their manner of application fundamentally is the same. Both provide a sealed double package the inner container of which is charged with coffee or other infusion material. The charged package may be wrapped in a suitable merchandising wrapper bearing a description of the contents and the method of use. This may be displayed and sold in the stores in the usual manner.

When the housewife is ready to brew the coffee, she removes it from the merchandising wrapper, opens the pour opening, and fills the outer container of the infusion package with water to the water line mark. The pressure sensitive tape closure is applied to reseal the package, which then may be supported by hanging it from a hook or by leaning it against a structural support.

The coffee then is allowed to steep at ordinary room temperature for a predetermined time of, for example, from 12 to 36 hours. During the steeping period the water extracts the flavorful and stimulating constituents of the coffee but does not remove the bitter oils.

After the steeping period has been completed, the closure flap is opened and the infusion drained from the container. The latter is discarded with the spent coffee grounds it contains. The infused extract is refrigerated and used as required in the brewing of coffee simply by placing the desired quantity of extract in the cup and adding hot water.

It is to be noted particularly that during the steeping operation the inner container is locked in position so that at all times it is maintained in the optimum steeping location. Furthermore, the inner container substantially fills the outer container so that most of the steeping liquid at all times is in contact with the infusion material thereby increasing the efficiency of the extraction and reducing the time required.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. An infusion package comprising
   (a) a flexible, liquid-pervious inner container closed along its side and top margins and initially open along its bottom margin for filling with material to be infused,
   (b) a flexible, liquid-impervious outer container closed along its side and top margins and initially open along its bottom margin, the outer container having an area larger than the area of the inner container,
   (c) the bottom margin of the inner container being secured to the bottom margin of the outer container, thereby anchoring the inner container and locating it in spaced relation to the outer container,
   (d) the bottom margin of the outer container being adapted to be sealed after the inner container has been filled with material to be infused, and
   (e) the outer container being adapted to be opened at the top thereof for filling the outer container to a predetermined level with a selected solvent and for removing the resulting infusion.

2. The infusion package of claim 1 including a closeable opening in the outer container at the top thereof and comprising
   (a) an area of the outer container cut to form a flap, and
   (b) a strip of pressure sensitive tape adhesively secured to the exterior of the flap and the area of the outer container surrounding said flap.

3. The infusion package of claim 1 wherein the inner and outer containers are rectangular, the inner container being narrower and shorter than the outer container.

4. The infusion package of claim 1 wherein the inner and outer containers are rectangular, the inner container being shorter than the outer container but of substantially the same width, and wherein the two side and bottom margin portions of the containers are sealed together.

5. The infusion package of claim 1 wherein
   (a) the outer container comprises a sheet of flexible, liquid-impervious thermoplastic material reversely folded to form an envelope having a top end, a bottom end, an open side and a closed side, and
   (b) the inner container comprises a sheet of flexible liquid-pervious material reversely folded to form a container having an open bottom and a closed top,
   (c) the sides of the inner container being fastened together and the bottom being open and formed with a plurality of spacer perforations,
   (d) the inner container being placed in the outer envelope with its perforate bottom underlapping the bottom margins of the envelope,
   (e) the margins of the envelope being heat-sealed to each other,
   (f) the bottom margin of the envelope being heat-sealed to each other through the perforations in the bottom of the inner container.

6. The infusion package of claim 1 wherein
   (a) the outer container comprises two sheets of flexible, liquid-impervious thermoplastic material placed in registration with each other and having top, bottom and side margins,
   (b) the inner container comprises a reversely folded sheet of flexible, liquid-pervious material having a closed top end and open side and bottom margins,
   (c) the side and bottom margins of the folded sheet being formed with a plurality of spaced perforations,
   (d) the folded sheet being placed between the two outer sheets with its perforated margins underlying the corresponding margins of the outer sheets,
   (e) the side and bottom margins of the outer sheets being heat-sealed to each other through the perforations in the reversely bent inner sheet, thereby forming an inner container adapted to contain the infusion material and contained within the outer container adapted to containe a steeping liquid.

7. An infusion package comprising
   (a) a flexible, liquid-pervious inner container closed along its margins and containing a material to be infused, and
   (b) a flexible, liquid-impervious outer container closed along its margins and having an area larger than the area of the inner container,
   (c) the bottom margin of the inner container being secured to the bottom margin of the outer container, thereby anchoring the inner container and locating it in spaced relation to the outer container,
   (d) the outer container being adapted to be opened at the top thereof for filling the outer container to a predetermined level with a selected solvent and for removing the resulting infusion.

8. The infusion package of claim 7 including a closeable opening in the outer container at the top thereof and comprising
   (a) an area of the outer container cut to form a flap, and
   (b) a strip of pressure sensitive tape adhesively secured to the exterior of the flap and the area of the outer container surrounding said flap.

References Cited

UNITED STATES PATENTS

| | | |
|---|---|---|
| 2,325,942 | 8/1943 | Drake. |
| 2,430,459 | 11/1947 | Farrell et al. _____ 206—46 X |
| 2,622,053 | 11/1952 | Clowe et al. _____ 161—115 |
| 2,715,089 | 8/1955 | Michener et al. _____ 161—115 |
| 2,805,164 | 9/1957 | Doppler _____ 99—171 |
| 3,084,984 | 4/1963 | Adler _____ 229—55 X |
| 3,159,096 | 12/1964 | Tocker _____ 99—77.1 X |
| 3,173,991 | 3/1965 | Breakfield _____ 161—115 X |
| 3,185,578 | 5/1965 | Scharre _____ 99—192 X |
| 3,224,586 | 12/1965 | Wade _____ 210—282 |

FOREIGN PATENTS 18,416   11/1889   Great Britain.

WILLIAM I. PRICE, *Primary Examiner.*